Oct. 28, 1958 R. B. SHURTS 2,858,083
DISPERSION APPARATUS
Filed April 15, 1953
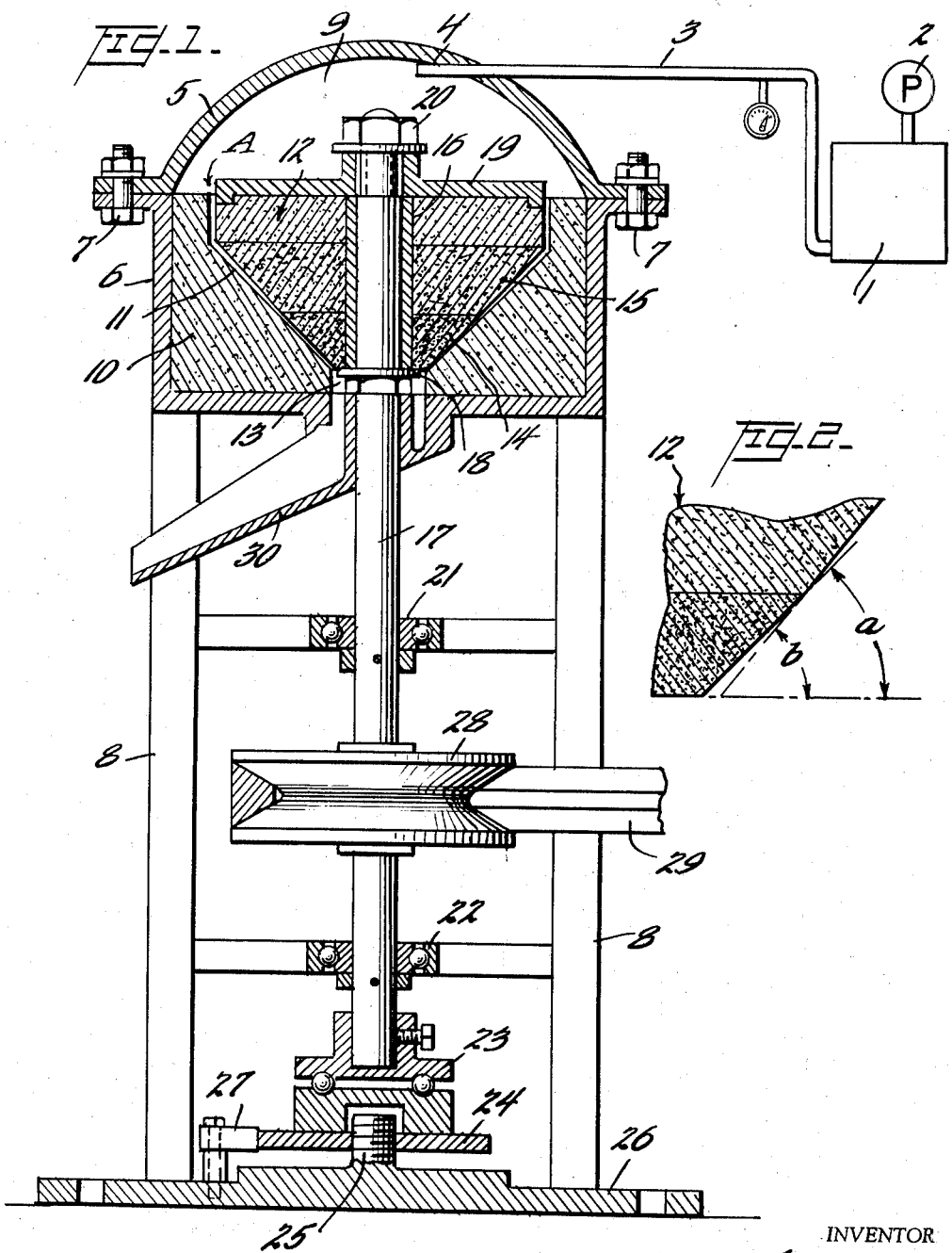
INVENTOR
R. B. Shurts
BY Watson, Cole, Grindle & Watson
ATTORNEYS

United States Patent Office 2,858,083
Patented Oct. 28, 1958

2,858,083

DISPERSION APPARATUS

Roswell B. Shurts, Hyattsville, Md., assignor to National Paint, Varnish and Lacquer Association, Inc., Washington, D. C., a corporation of Delaware Application April 15, 1953, Serial No. 348,890

2 Claims. (Cl. 241—257)

This invention relates to the wetting and dispersion of fine particles, solid or otherwise, in liquid media, by the use of colloid or high-speed stone mills, and more particularly to mills utilized in paint manufacture for the dispersion and wetting of pigment particles while suspended in a liquid medium.

Ground pigments as received by the paint manufacturer are usually of such small particle size that further comminution prior to suspension of the pigment in a suitable liquid vehicle is unnecessary. However, it is an inherent property of pigment particles when mixed with a vehicle to group together forming aggregates, flocculates, agglomerates or the like. Thus it is necessary for the paint manufacturer to separate or break down these large adhering groups of dry or partially wetted pigment particles into separate particles or smaller groups so that a vehicle film is formed about such smaller groups or particles thereby preventing their subsequent adhesion into larger groups or agglomerates.

To accomplish this dispersion or wetting operation the paint manufacturer has used various types of equipment including ball and pebble mills, roller mills, colloid or high speed stone mills, and heavy duty dispersion mixers. All such mills now in use have one major deficiency which is their inability to separate the well dispersed and wetted pigment particles from those insufficiently dispersed and wetted. For example, in the operation of a ball and pebble mill approximately 90% of the total pigment may be fully dispersed and wetted in the first 25% of the total time required to properly disperse and wet the entire pigment suspension. This factor necessitates long periods of operation in ball and pebble mills and dispersion mixers, as well as repeated passage of the fluid material through colloid or high speed stone and roller mills.

Accordingly, it is the primary object of this invention to provide a mill for the dispersion or wetting of pigment particles suspended in a vehicle in which high disperson times are eliminated through selective separation by size of the particle groups so suspended in order that the larger agglomerates of pigment are not permitted to pass through the mill. This objective has been attained in my invention which comprises a high speed stone mill so modified that the liquid suspension, in a shallow stream, is forced through the mill against the opposing centrifugal force on the suspended particles produced by their coming in contact with the rapidly revolving rotor. In this manner the larger agglomerates are thrown back into the mill for further dispersion or wetting while the smaller, dispersed particles are forced through the mill. Consequently, processing times have been greatly reduced and the quality of the finished product greatly enhanced.

To accomplish such selective separation of the wetted pigment particles and the larger agglomerates of pigment, I have provided a modified high speed stone mill including relatively movable concentric grinding walls which taper conically and have a decreasing clearance from a larger to a smaller conical diameter, whereby the shallow stream of liquid suspension passing between the grinding walls is progressively decreased in depth as it moves toward the outlet end of the mill. I mix ground pigment in a vehicle of low tack, and supply this vehicle and suspended pigment under pressure between the grinding walls at their largest conical diameter so that the agglomerates are broken up or wetted by the grinding surfaces as the agglomerates pass to points of ever decreasing clearance between the grinding walls. However, I impede passage of the agglomerates between the conical walls, by the centrifugal forces imparted to the pigment particles from the relatively rotating grinding walls. Because of the greater mass of the agglomerates relative to the smaller wetted pigment particles, the agglomerates are propelled by a greater centrifugal force which overcomes the supply pressure to throw them outwardly toward a larger conical wall diameter, thereby subjecting the agglomerates to further grinding and separating them from the divided wetted pigment particles. The wetted pigment suspension so separated is then collected, a material outlet being provided from the smallest diameter of the passage between the conical grinding walls.

Other and further objects, features and advantages will be apparent from the description which follows, read in connection with the accompanying drawings in which Figure 1 is a vertical cross section taken through the center of my improved high speed stone mill; and Figure 2 is an enlarged fragmentary cross section showing the lower rotor contact surface of my improved stone mill slightly exaggerated in form.

In order to facilitate an understanding of the invention, reference is made to the embodiment thereof, shown in the accompanying drawings and detailed descriptive language is employed. It will nevertheless be understood that no limitation of the invention is thereby intended and that various changes and alterations are contemplated such as would ordinarily occur to one skilled in the art to which the invention relates.

In Figure 1 is shown a vertical cross sectional view of my improved high speed stone mill for dispersing and/or wetting pigments in a liquid vehicle. The vehicle in which the pigment particles are suspended should be of low tack or strength to permit relatively free movement of the pigment particles therein. Vehicles under such a low tack classification generally are those in which the vehicle solids range from 1% to 20%. In this connection, by vehicle solids is meant that part of the vehicle which is fluid but non-volatile, such as oils, resins, synthetic resins and the like. A pigment mixed with such a vehicle is placed in supply tank 1 shown in Figure 1 of the drawings and conducted under pressure from pump 2 through conduit 3 to the inlet port 4 of the stone mill.

The stone mill comprises upper and lower casing members 5 and 6, respectively, joined in air-tight relation as by bolts 7. The casing members are supported by legs 8. The upper casing member 5 defines a material supply chamber 9 in which the liquid suspension is accumulated under pressure prior to dispersion or wetting operations. Casing member 6 serves as an enclosure for a stator stone 10 having a frusto-conical cavity therein defined by the surface 11, the larger diameter of this cavity opening into chamber 9. Rotatably supported in this cavity is a rotor stone designated generally at 12 which defines, with the cavity wall a concentric material dispersion passage A. Below the dispersion passage is a discharge port 13 which is communicably connected to a discharge spout 30 beneath which a container or other receptacle may be positioned to receive the processed dispersion.

Clearance between rotor and stator decreases downwardly to an intermediate diameter in the conical material passage between the stones. This intermediate diameter preferably bisects the conical walls. Clearance between rotor and stator from this intermediate point downwardly to the discharge port 13 in the stator preferably is uniform. Thus, during the first portion of material travel through the passage defined by rotor and stator the suspended pigment is subjected to a wedging action due to the ever decreasing clearance. Smaller particles which proceed downwardly past this intermediate point are subjected to further dispersion by the small uniform clearance in the lower material passage.

This clearance arrangement is obtained by providing the conical walls of the stator with a uniform taper, however, the conical rotor walls are provided with two variant tapers. In Figure 2 it will be observed that the lower portion of the rotor wall tapers, when referred to the horizontal, at an angle $a$ which is smaller than the angle of taper $b$ of the upper portion of the stator cone. The lower angle of taper $a$ is identical to the uniform taper of the stator, angle $b$ being greater to provide the wedging action hereinbefore mentioned. Of course, a like effect could be obtained by variant conical tapers on the stator and rotor, or on the stator alone.

The entire stator stone and the lower section 14 of the rotor stone should be of fine texture or grit. The upper section of the conical rotor 15 should be of noticeably coarser grit thereby producing a better grabbing action of the rotor and effecting a maximum tendency to throw back the larger agglomerates of pigment. Throwing back of the larger agglomerates toward chamber 9 results from the greater centrifugal force imparted to the larger agglomerates because of their greater weight relative to the dispersed pigment particles.

The rotor is provided with a concentric lead bushing 16 through which a shaft 17 is passed. The rotor is fixed to the shaft for rotation therewith by confinement of the rotor between peripheral shoulder 18 on the shaft and keeper plate 19, a nut 20 being threaded to the upper end of the shaft to hold the keeper firmly against the rotor.

Shaft 17 is aligned in the vertical by bearings 21 and 22 fixed on chamber supporting legs 8. A thrust bearing 23 is adapted to receive the lower end of the shaft, vertical position of bearing 23 determining clearance between the rotor and stator. Vertical positioning of the thrust bearing may be accomplished in many ways. In my preferred embodiment the thrust bearing is supported upon an internally threaded annular plate 24, the internal threads of the plate cooperating with a threaded upstanding stud 25 on the base of the mill 26. A resilient pawl 27 may be employed for engagement of spaced notches on the annular periphery of plate 24, thereby locking the thrust bearing against vertical displacement.

Shaft 17 may be rotated in any suitable manner. In my preferred embodiment a pulley 28 is keyed to the shaft and driven from a source of power by belt 29. The power source should be of a variable speed type, for optimum mill results are dependent upon rotor speed. Because vehicle tack and pigment density will vary according to the desired end product, the centrifugal forces necessary to propel larger agglomerates through these media of variable density will differ. Thus, there are different optimum speeds for the range of suspensions required to be passed through the mill.

It is equally important that pump pressure be accurately controllable for forcing the paint through the mill against the backward centrifugal pressure on adhering particles or agglomerates. For example, in an experimental model of my invention an air pressure of less than one pound was required in order to force a paint suspension through the mill with the rotor stationary. As the rotor was turned at increasing speeds up to 6500 peripheral feet per minute the air pressure required to start the suspension through the mill increased by stages corresponding to the increased rotor speed up to a maximum of 20 to 25 pounds. Thus, it is seen that the centrifugal force imparted to agglomerates of pigment tending to throw the agglomerates upwardly and outward of the mill is a function of rotor speed. This centrifugal force produced by the rotor must in part be overcome by an oppositely acting pressure on the agglomerates tending to force them back into the mill for further dispersion or wetting. Relation between pressure and rotor speed is therefore determined by pigment density and vehicle tack and thus rotor speeds and material supply pressure should be variable according to requirements dictated by the material passing through the mill.

Having thus described my invention what I claim as my invention and desire to secure by Letters Patent is:

1. In a high speed stone mill for treating a fluid material comprising finely divided particles in a liquid vehicle, a stator, a grinding cavity in said stator having a frusto-conical wall of substantial cone angle, a grinding rotor having a frusto-conical wall rotatably mounted concentrically in the cavity for cooperation with said cavity wall to define a narrow frusto-conical material dispersion passage, the clearance between the rotor and cavity wall in said passage decreasing gradually from a first passage diameter to a second passage diameter smaller than the first, the clearance between the rotor and cavity wall in said passage being uniform from said second diameter to a third diameter smaller than the second, means to supply material under pressure to said passage at its widest diameter, a material outlet from the smallest diameter of said passage, and means to rotate said rotor.

2. In a high speed stone mill for treating a fluid material comprising finely divided particles in a liquid vehicle, a stator, a grinding cavity in said stator having a frusto-conical abrasive wall of fine grit having a substantial cone angle, a grinding rotor having a frusto-conical abrasive wall rotatably mounted concentrically in the cavity for cooperation with said cavity wall to define a narrow frusto-conical material dispersion passage, the clearance between the rotor and cavity wall in said passage decreasing gradually from a first passage diameter to a second passage diameter smaller than the first, the clearance between the rotor and cavity wall in said passage being uniform from said second diameter to a third diameter smaller than the second, said frusto-conical wall of the rotor being of coarse grit between said first and second diameters and of fine grit between said second and third diameters, means to supply material under pressure to said passage at its widest diameter, a material outlet from the smallest diameter of said passage, and means to rotate said rotor.

References Cited in the file of this patent

UNITED STATES PATENTS

| Re. 8,845 | Taylor | Aug. 12, 1879 |
| 278,954 | Hastings | June 5, 1883 |
| 683,976 | Palmie | Oct. 8, 1901 |
| 761,334 | Sturtevant et al. | May 31, 1904 |
| 1,074,299 | Strack | Sept. 30, 1913 |
| 1,237,222 | Schroder | Aug. 14, 1917 |
| 1,340,635 | Stenbo | May 18, 1920 |
| 1,523,478 | Fischer | Jan. 20, 1925 |
| 1,775,743 | Wiener | Sept. 16, 1930 |
| 1,814,587 | Daniels | July 14, 1931 |
| 1,851,071 | Travis | Mar. 29, 1932 |
| 2,147,821 | Morehouse | Feb. 21, 1939 |
| 2,212,544 | Lund | Aug. 27, 1940 |
| 2,591,966 | Rider | Apr. 8, 1952 |
| 2,592,709 | Kinnaird | Apr. 15, 1952 |
| 2,738,930 | Schneider | Mar. 20, 1956 |

FOREIGN PATENTS

| 304,858 | Germany | Aug. 14, 1917 |
| 866,896 | Germany | Feb. 12, 1953 |